UNITED STATES PATENT OFFICE.

WILLIAM BIRCH, OF WALWORTH, GREAT BRITAIN, ASSIGNOR OF ONE-HALF HIS RIGHT TO CHARLES I. TEMPLE, OF CHESTER, PENNSYLVANIA.

IMPROVEMENT IN TREATING HORN TO RESEMBLE WHALEBONE.

Specification forming part of Letters Patent No. 145,045, dated December 2, 1873; application filed November 8, 1873.

*To all whom it may concern:*

Be it known that I, WILLIAM BIRCH, of Penrose street, Walworth, in the county of Surrey, in the United Kingdom of Great Britain and Ireland, have invented a Mode and Apparatus for Treating Horny and other Analogous Animal Substances, for the purpose of converting them into an elastic substance to be used in place of whalebone, or bristles, or for other purposes, for which such elastic substance may be applicable.

My invention has for its objects to produce from the horns and hoofs of animals a hard elastic substance, resembling whalebone in appearance, flexibility, and elasticity, and some other of its characteristics. I am also enabled, by slightly modifying the process, to produce from such horny substances filaments resembling bristles, which may be used for the manufacture of brushes, brooms, and other articles which are usually made of bristles.

The treatment to which the horny substance is subjected, to effect the objects of my invention, is a combination of chemical and mechanical processes. The chemical process is used to soften the substance, and the subsequent mechanical operation is employed either to consolidate, flatten, roll out, and extend or mold the softened horny matter, or to disintegrate it into thread-like fibers or filaments.

Various chemical agents will soften the horny substance so as to prepare it for the after mechanical process; but the agents I prefer to use for this purpose are certain vegetable infusions which possess this property in an eminent degree. An infusion of sage, or plants of that class, in hot water will give very satisfactory results; and in carrying out my invention I make an infusion or decoction of sage leaves by steeping the vegetable substance in boiling water, in the proportion of eight pounds of sage leaves and stalks to twenty gallons of water, in which are dissolved six ounces of potash or other suitable alkali. The vegetable substances may remain in the boiling water for ten hours or until all the vegetable extract has been drawn out.

The horny substances to be operated upon (say, bullocks', buffaloes', or any other horn) are first softened to such an extent as will admit of them being consolidated or straightened in a screw, hydraulic, or other press provided with suitable dies. If it be desired only to consolidate or solidify the hollow horn, the latter is softened in the manner hereafter explained, and then simply subjected to pressure so as to form a solid substance of considerable thickness, which, if desired, may be afterward cut up into bars or bands of any sectional area.

Straightening the curved or crooked horns is found advantageous, as the horns can then be more conveniently split or cut up longitudinally into strips of suitable size for the subsequent processes. The splitting or dividing operation is most conveniently done by means of a circular saw, but other means may be employed, if preferred. The wide strips of horn, thus produced, may either be cut up at once into narrower strips, or they may be steeped a second time in the vegetable solution, which must be heated to considerably above the boiling-point of water; to which end the softening operation must be carried on in a close vessel properly secured, so that a suitable amount of steam-pressure may be obtained. I have found that a pressure of about five pounds on the square inch will give very good results, but occasionally a stronger pressure is required. If the horny matters are subjected to the action of the vegetable infusions at this pressure they will, in the course of about three hours, become soft enough to be operated upon by the mechanical processes hereafter described.

For the convenience of manipulation in the softening process I place the horny substances in a perforated vessel, which is capable of being lifted in and out of the close boiler, so that the vessel can be charged and discharged of its contents with facility. The use of a separate and movable vessel, to receive the horny substances, will moreover prevent the latter from adhering to the bottom or sides of the boiler and being burnt or charred by the heat. When the horny strips are in a sufficiently soft state they are subjected, while hot, to a rolling operation. By passing the softened strips of horn between rollers they may not only be flattened, but also rolled out and elongated; and as they will be subjected to very great pressure, the end of one strip may be so securely and effectually joined onto the next that no joint will be observable, and a strong and perfect joint will be made. By passing a number of strips between the rollers they will be rolled out and converted into sheets of any desired width and thickness. Two or more strips may, by the pressure to which they will be subjected, be joined together laterally, as well as longitudinally. The horny strips may be converted either into sheets or made into bars, or sticks, according to the shape of the rollers, and the purpose for which the prepared substance is to be used.

If it be desired to produce thin filaments, to be used in the place of bristles, the strips of softened horny substances are to be rolled down into such thin sheets that the fibers of the horn will be separated laterally from each other, or will only be feebly held together by the gelatinous matter contained in the horn, and may therefore be easily detached. As separate pieces of the horny substances will not adhere together, even when subjected to great pressure, unless they are in a soft and heated state, it is necessary that the horny strips should be passed through the rolling-machine immediately they are taken from the softening-boiler; and in order to prevent them from being chilled when brought into contact with the surfaces of the metal rollers, these latter are heated by steam admitted into them from steam-pipes through their hollow axles. The condensed steam is removed from the interior of the rollers by means of scoops, which will convey the water to the hollow axles at the opposite ends of the rollers so that it may run away. A slow rotary motion is imparted to the rollers by means of the toothed gearing, and the top and bottom rollers are adjustable in their bearings, so that they may be raised or lowered according to the thickness to which it may be desired to reduce the horny substance.

I claim as my invention—

Subjecting horny substances to a combination of chemical and mechanical processes for the purpose of first softening and then pressing, consolidating, rolling out, or otherwise treating the same, as and for the purposes and in the manner herein set forth.

WILLIAM BIRCH.

Witnesses:
  ROBT. DE TRACY GOULD,
    4 Garden court, Temple, London.
  CECIL A. GOULD,
    4 Garden court, Temple, London.